United States Patent
Mori et al.

(10) Patent No.: US 9,616,391 B2
(45) Date of Patent: Apr. 11, 2017

(54) BLACK POROUS POLYTETRAFLUOROETHYLENE MEMBRANE, METHOD FOR PRODUCING SAME, GAS-PERMEABLE MEMBRANE AND VENTILATION MEMBER USING SAME

(71) Applicant: NITTO DENKO CORPORATION, Ibaraki-shi, Osaka (JP)

(72) Inventors: Masaaki Mori, Osaka (JP); Yuri Horie, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/415,905

(22) PCT Filed: Jun. 3, 2013

(86) PCT No.: PCT/JP2013/003494
§ 371 (c)(1),
(2) Date: Jan. 20, 2015

(87) PCT Pub. No.: WO2014/020812
PCT Pub. Date: Feb. 6, 2014

(65) Prior Publication Data
US 2015/0165386 A1   Jun. 18, 2015

(30) Foreign Application Priority Data
Aug. 2, 2012   (JP) .................. 2012-171794

(51) Int. Cl.
*B01D 71/36* (2006.01)
*B01D 53/22* (2006.01)
(Continued)

(52) U.S. Cl.
CPC ......... *B01D 71/36* (2013.01); *B01D 39/1692* (2013.01); *B01D 67/002* (2013.01);
(Continued)

(58) Field of Classification Search
CPC .. B01D 39/16; B01D 39/1692; B01D 67/002; B01D 67/0027; B01D 69/02;
(Continued)

(56) References Cited

U.S. PATENT DOCUMENTS 4,624,709 A * 11/1986 Otsuka ............... C09B 17/02
106/31.28
2010/0104845 A1* 4/2010 MacLennan .......... B01D 71/36
428/221

(Continued)

FOREIGN PATENT DOCUMENTS

JP  3-199475   8/1991
JP  7-289865   11/1995
(Continued)

OTHER PUBLICATIONS

English language machine translation for JP 2011-52180. Retrieved from https://www4.j-platpat.inpit.go.jp on Feb. 4, 2016.*
(Continued)

*Primary Examiner* — Jason M Greene
(74) *Attorney, Agent, or Firm* — Hamre, Schumann, Mueller & Larson, P.C.

(57) ABSTRACT

Provided is a black porous polytetrafluoroethylene membrane including a porous polytetrafluoroethylene membrane dyed black. A whiteness of a principal face of the black porous polytetrafluoroethylene membrane as measured according to JIS L 1015 (Hunter method) is 18.0 to 23.0%, and the whiteness of the principal face falls within a range of 18.0 and 25.0% after heating at 350° C. for 1 minute. This black porous PTFE membrane is suitable as a gas-permeable membrane that blocks entry of water and/or dust and that allows permeation of gases; specifically, the black porous PTFE membrane is suitable, for example, as a waterproof
(Continued)

sound-transmitting membrane, a waterproof gas-permeable membrane, and a dustproof gas-permeable membrane.

7 Claims, 5 Drawing Sheets

(51) Int. Cl.
| | |
|---|---|
| *B29C 55/00* | (2006.01) |
| *C08L 27/18* | (2006.01) |
| *B01D 69/02* | (2006.01) |
| *B01D 39/16* | (2006.01) |
| *B29C 55/14* | (2006.01) |
| *B01D 67/00* | (2006.01) |
| *D06P 7/00* | (2006.01) |
| *B29K 105/00* | (2006.01) |
| *B29K 27/18* | (2006.01) |
| *B29K 105/04* | (2006.01) |
| *B29L 7/00* | (2006.01) |

(52) U.S. Cl.
CPC ......... *B01D 67/0027* (2013.01); *B01D 69/02* (2013.01); *B29C 55/005* (2013.01); *B29C 55/14* (2013.01); *C08L 27/18* (2013.01); *D06P 7/005* (2013.01); *B01D 2325/38* (2013.01); *B29K 2027/18* (2013.01); *B29K 2105/0032* (2013.01); *B29K 2105/04* (2013.01); *B29K 2995/002* (2013.01); *B29L 2007/008* (2013.01)

(58) Field of Classification Search
CPC .. B01D 71/36; B01D 2325/38; B29C 55/005; B29C 55/14; B29K 2027/008; B29K 2027/18; B29K 2105/0032; B29K 2105/04; B29K 2995/002; C08L 27/18; D06P 3/00

See application file for complete search history.

(56) References Cited

U.S. PATENT DOCUMENTS

| | | | |
|---|---|---|---|
| 2010/0203790 A1* | 8/2010 | Moulton | B32B 5/02 442/394 |
| 2010/0307118 A1* | 12/2010 | Kawano | B01D 39/1692 55/483 |
| 2011/0188247 A1* | 8/2011 | Huang | B01D 71/36 55/486 |

FOREIGN PATENT DOCUMENTS

| | | | | |
|---|---|---|---|---|
| JP | 8-027304 | | 1/1996 | |
| JP | 10-165787 | | 6/1998 | |
| JP | 2001-011779 | | 1/2001 | |
| JP | 2004-083811 | | 3/2004 | |
| JP | 2011-52180 | * | 3/2011 | ............... C08J 9/00 |
| JP | 2011-052180 | | 3/2011 | |

OTHER PUBLICATIONS

"Munsell Color Code", United States Geological Survey, Jan. 2014, 4 pages. Retrieved from http://pubs.usgs.gov on Aug. 1, 2016.*
Porex: "Porex Porous PTFE Materials for Medical, Analytical and Industrial Applications", http://www.porex.com/files/documents/porous-ptfe-materials.pdf, Dec. 31, 2010 (retrieved Feb. 25, 2016), XP055253229, 2 pages.
Extended European Search Report issued is corresponding European Patent Application No. 13825359.6, Mar. 16, 2016, 7 pages.

* cited by examiner

BLACK POROUS POLYTETRAFLUOROETHYLENE MEMBRANE, METHOD FOR PRODUCING SAME, GAS-PERMEABLE MEMBRANE AND VENTILATION MEMBER USING SAME

TECHNICAL FIELD

The present invention relates to a porous polytetrafluoroethylene membrane that is black (black porous polytetrafluoroethylene membrane) and that is less subject to color fading caused by heat and/or light than conventional ones. The present invention also relates to a gas-permeable membrane and a ventilation member using the porous membrane.

BACKGROUND ART

In recent years, it has been common for electronic devices, such as mobile phones, laptop computers, electronic notebooks, digital cameras, and video-game instruments, to have an audio function. These devices are desired to have a waterproof structure. However, a housing of an electronic device having an audio function is usually provided with openings located at positions corresponding to those of a sound emitter and a sound receiver such as a speaker, a microphone, and a buzzer, and sound needs to be transmitted through these openings, which makes it difficult to form a waterproof structure while ensuring the audio function. Hitherto, it has been attempted to ensure both the sound transmitting properties and the waterproof properties at an opening of a housing by covering the opening with a waterproof sound-transmitting membrane. The waterproof sound-transmitting membrane is a thin membrane made of a material that causes less disturbance in the transmission of sound. With the membrane disposed to the opening, it is possible to prevent entry of water into the interior of the housing while assuring good sound transmitting properties. A gas-permeable membrane that blocks entry of water and allows permeation of gases is suitable as the waterproof sound-transmitting membrane; more specifically, a gas-permeable membrane including a porous polytetrafluoroethylene (PTFE) membrane is suitable (see Patent Literature 1).

The intrinsic color of porous PTFE membranes is white. A waterproof sound-transmitting membrane is usually disposed in the interior of a housing so as to cover an opening. If the membrane is white, the membrane is conspicuous. Conspicuity of the membrane may be a defect in terms of the design quality of an electronic device, and is likely to stimulate the curiosity of a user and lead to damage to the membrane caused by stabbing with a writing instrument or the like. Therefore, a porous PTFE membrane that is black (black porous PTFE membrane) and that is thus less conspicuous when disposed on a housing has been demanded.

A black porous PTFE membrane is disclosed in Patent Literature 2. In addition, a porous PTFE membrane that is not black but colored gray or pink is described in Patent Literature 3.

A gas-permeable membrane including a porous PTFE membrane can be used not only as a waterproof sound-transmitting membrane but also as a waterproof and/or dustproof gas-permeable membrane that blocks entry of water and/or dust and that allows permeation of gases

CITATION LIST

Patent Literature

Patent Literature 1: JP 2004-83811 A
Patent Literature 2: JP H8(1996)-27304 A
Patent Literature 3: JP H7(1995)-289865 A

SUMMARY OF INVENTION

Technical Problem

Conventional colored porous PTFE membranes are prone to fading of the imparted color caused by exposure to a high-temperature atmosphere or irradiation with light (typically, irradiation with sunlight).

The present invention aims to provide a black porous PTFE membrane that is excellent in color fading resistance and that is less subject to color fading caused by heat and/or light than conventional colored porous PTFE membranes.

Solution to Problem

The present invention provides a black porous PTFE membrane including a porous PTFE membrane dyed black. A whiteness of a principal face of the black porous PTFE membrane as measured according to JIS L 1015 (Hunter method) is 18.0 to 23.0%, and the whiteness of the principal face falls within a range of 18.0 and 25.0% after heating at 350° C. for 1 minute.

The present invention provides a method for producing the black porous PTFE membrane, the method including: a forming step of forming a sheet-shaped body from a mixture containing PTFE; a first stretching step of stretching the sheet-shaped body in a first direction to form a porous membrane; a dyeing step of dyeing black the sheet-shaped body stretched in the first direction; and a second stretching step of stretching the sheet-shaped body in a second direction different from the first direction to form a black porous membrane.

The present invention provides a gas-permeable membrane that blocks entry of water and/or dust and allows permeation of gases, the gas-permeable membrane having a multilayer structure including the black porous PTFE membrane and a gas-permeable supporting member. The black porous PTFE membrane is exposed on at least one principal face of the gas-permeable membrane.

The present invention provides a ventilation member including: the black porous polytetrafluoroethylene membrane or the gas-permeable membrane; and a supporting member supporting the black porous polytetrafluoroethylene membrane or the gas-permeable membrane.

Advantageous Effects of Invention

According to the present invention, a black porous PTFE membrane is formed in which a whiteness of its principal face is 18.0 to 23.0% and the whiteness of the principal face falls within a range of 18.0 and 25.0% after heating at 350°

C. for 1 minute; therefore, it is possible to provide a black porous PTFE membrane that is excellent in color fading resistance and that is less subject to color fading caused by heat and/or light than conventional colored porous PTFE membranes.

Figure 1:
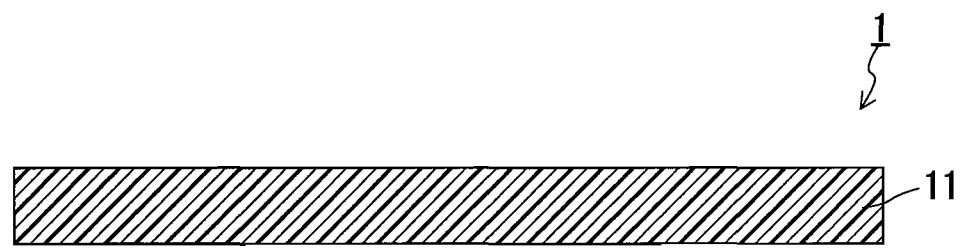
FIG. 1 is a cross-sectional view schematically showing an example of the gas-permeable membrane of the present invention.

DESCRIPTION OF EMBODIMENTS (Black Porous PTFE Membrane)

The black porous PTFE membrane of the present invention is a porous PTFE membrane dyed black. A whiteness of its principal face as measured according to JIS L 1015 is 18.0 to 23.0%. After heating at 350° C. for 1 minute, the whiteness of the principal face falls within a range of 18.0 and 25.0%. This whiteness W is determined from the following formula by measuring lightness L, hue a, and chroma b with a Hunter color-difference meter.

$$W=100-\mathrm{sqr}[(100-L)^2+(a^2+b^2)]$$

A higher whiteness indicates that the membrane is whiter. If the whiteness is 0%, this means that the membrane is completely black. Such a black porous PTFE membrane can be formed, for example, by immersing a porous PTFE membrane in a dye solution containing a dye or applying a dye solution containing a dye to a porous PTFE membrane, and then by removing the dye solvent contained in the dye solution by drying or the like. The methods for the immersion and application are not particularly limited. The dye is a dye that allows a white porous PTFE membrane not subjected to any coloring treatment to be dyed in such a manner that the whiteness of the principal face of the membrane is 18.0 to 23.0%, and that the whiteness of the principal face falls within a range of 18.0 and 25.0% after heating at 350° C. for 1 minute. For example, an azine-based dye having a phenazine ring is suitable. The dye is preferably a dye having a higher melting point than PTFE. The melting point of the dye is preferably higher than 360° C. which is a temperature above the melting point of PTFE, and is more preferably higher than 400° C. The dye solution usually contains the dye and a solvent for diluting the dye and improving the efficiency of the dyeing operation. A porous PTFE membrane is chemically stable; therefore, the type of the solvent is not particularly limited, and can be selected as appropriate in view of the type of the dye, the efficiency of the dyeing operation, etc. The concentration of the dye in the dye solution needs to be such that a white porous PTFE membrane not subjected to any coloring treatment can be dyed in such a manner that the whiteness of the principal face of the membrane is 18.0 to 23.0%, and that the whiteness of the principal face falls within a range of 18.0 and 25.0% after heating at 350° C. for 1 minute. The concentration is usually 5 weight % or more.

A porous PTFE membrane to be dyed black can be obtained by a commonly-known technique. For example, the porous PTFE membrane can be formed as follows: a mixture of a PTFE fine powder and a forming aid is formed into a sheet shape by extrusion molding and rolling; the forming aid is removed to obtain a sheet of the formed body; and then the obtained sheet is further stretched. A black porous PTFE membrane of the present invention obtained from the thus-fabricated porous PTFE membrane has a porous structure in which voids between a huge number of fine PTFE fibers (fibrils) formed are present as pores. The average pore diameter and the porosity of this porous structure can be adjusted by changing the conditions of stretching of the sheet, and the specific values of the average pore diameter and the porosity may be selected depending on the intended use of the black porous PTFE membrane of the present invention.

The black porous PTFE membrane of the present invention may be subjected to liquid-repellent treatment. In this case, the porous membrane can be provided with excellent water repellency and oil repellency. Such a porous membrane is suitable for use as a gas-permeable membrane such as a waterproof sound-transmitting membrane. The liquid-repellent treatment can be carried out by a commonly-known method after the porous PTFE membrane is dyed black. The liquid-repellent agent used in the liquid-repellent treatment is not particularly limited, and is typically a material containing a polymer having a perfluoroalkyl group.

(Gas-Permeable Membrane)

The configuration of the gas-permeable membrane of the present invention is not particularly limited as long as the gas-permeable membrane includes the black porous PTFE membrane of the present invention.

FIG. 1 shows an example of the gas-permeable membrane of the present invention. A gas-permeable membrane 1 of FIG. 1 consists of a black porous PTFE membrane 11 of the present invention. The gas-permeable membrane 1 has the property of blocking entry of water and/or dust and allowing permeation of gases, by virtue of the above-described porous structure of the black porous PTFE membrane 11. The gas-permeable membrane 1 is black, and is less conspicuous than a white porous PTFE membrane, for example, when disposed at an opening of a housing of an electronic device. In addition, since the gas-permeable membrane 1 has a single-layer structure consisting of the black porous PTFE membrane 11, a low surface density can be achieved. The lower the surface density of the gas-permeable membrane is, the smaller the sound transmission loss at the membrane is, and thus the better the sound transmitting properties are. Therefore, the gas-permeable membrane 1 is particularly suitable for use as a waterproof sound-transmitting membrane that is disposed at an opening of a housing of an electronic device having a sound emitter and/or a sound receiver and that is intended to ensure the sound transmitting properties and the waterproof properties at the opening.

Naturally, the gas-permeable membrane 1 is suitable for uses other than use as a waterproof sound-transmitting membrane, such as use as a waterproof and/or dustproof gas-permeable membrane that utilizes the property of blocking entry of water and/or dust and allowing permeation of gases. For example, the waterproof gas-permeable membrane (dustproof gas-permeable membrane) is disposed on a housing of an electric component for vehicles such as a lamp, a motor, a sensor, and an ECU, and is used for ensuring ventilation between the inside and outside of the housing and reducing a pressure change in the housing due to a temperature change.

The average pore diameter of the black porous PTFE membrane 11 in the gas-permeable membrane 1 is generally 0.01 to 20 μm, and is preferably 0.05 to 5 μm. When the gas-permeable membrane 1 is used as a waterproof sound-transmitting membrane, the average pore diameter of the black porous PTFE membrane 11 is preferably 1 μm or less, more preferably 0.7 μm or less, and even more preferably 0.5 μm or less, from the viewpoint of ensuring both the waterproof properties and the sound transmitting properties. The lower limit of the average pore diameter is not particularly specified, and is, for example, 0.1 μm. The average pore diameter of the porous PTFE membrane can be measured according to the standards specified in ASTM F 316-86. For example, a commercially-available measurement apparatus capable of performing automatic measurement according to the above standards (Perm-Porometer available from Porous Material Inc. in the United States) can be used for the measurement of the average pore diameter of the porous PTFE membrane.

When the gas-permeable membrane 1 is used as a waterproof sound-transmitting membrane, the surface density of the gas-permeable membrane 1 is preferably 1 to 10 $g/m^2$, more preferably 2 to 8 $g/m^2$, and even more preferably 3 to 6 $g/m^2$, from the viewpoint of ensuring both the physical strength and the transmitting properties of the membrane. When the gas-permeable membrane is used as a waterproof gas-permeable membrane or a dustproof gas-permeable membrane which is not required to have good sound transmitting properties, the surface density of the gas-permeable membrane 1 is not particularly limited.

The black porous PTFE membrane 11 may be subjected to liquid-repellent treatment. In this case, the water repellency and oil repellency of the gas-permeable membrane 1 are improved. The effect obtained by using the black porous PTFE membrane 11 subjected to liquid-repellent treatment is the same for gas-permeable membranes 2, 3, and 4 shown in the subsequent FIGS. 2 and 3.

Figure 2:
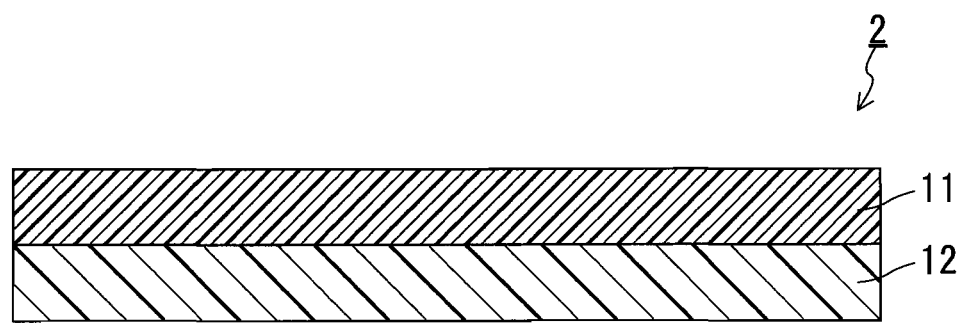
FIG. 2 is a cross-sectional view schematically showing another example of the gas-permeable membrane of the present invention.

FIG. 2 shows another example of the gas-permeable membrane of the present invention. A gas-permeable membrane 2 of FIG. 2 has a multilayer structure including the black porous PTFE membrane 11 of the present invention and a gas-permeable supporting member 12 supporting the porous membrane 11. The gas-permeable membrane 2 has the property of blocking entry of water and/or dust and allowing permeation of gases, by virtue of the above-described porous structure of the black porous PTFE membrane 11. In the gas-permeable membrane 2, the black porous PTFE membrane 11 is exposed to the outside. For example, if the gas-permeable membrane 2 is disposed at an opening of a housing of an electronic device in such a manner that the black porous PTFE membrane 11 faces the outside of the housing, the gas-permeable membrane 2 is less conspicuous than a white porous PTFE membrane. The gas-permeable membrane 2 is not particularly limited in use, and can be suitably used as a waterproof sound-transmitting membrane, a waterproof gas-permeable membrane, or a dustproof gas-permeable membrane.

The gas-permeable supporting member 12 is not particularly limited in material and structure, but is preferably superior in gas-permeability to the black porous PTFE membrane 11. The gas-permeable supporting member 12 is, for example, a woven fabric, a non-woven fabric, a mesh, a net, a sponge, a foam, or a porous body made of a metal, a resin, or a composite material thereof. The resin is, for example, polyolefin, polyester, polyamide, polyimide, aramid, fluorine resin, or ultrahigh molecular weight polyethylene. When the black porous PTFE membrane 11 and the gas-permeable supporting member 12 are stacked together, they may be joined together using any of various joining methods such as thermal lamination, heat welding, and ultrasonic welding.

The gas-permeable membrane 2 may have two or more black porous PTFE membranes 11 and/or two or more gas-permeable supporting members 12. In this case, the order in which they are stacked is not particularly limited. However, in order for the gas-permeable membrane 2 to be less conspicuous than a white porous PTFE membrane when disposed at an opening of a housing of an electronic device, it is preferable that the black porous PTFE membrane 11 be exposed on at least one principal face as shown in FIG. 2. In other words, the gas-permeable membrane of the present invention may have a multilayer structure including the black porous PTFE membrane of the present invention and the gas-permeable supporting member, and in this case, it is preferable that the black porous PTFE membrane be exposed on at least one principal face.

The average pore diameter of the black porous PTFE membrane 11 in the gas-permeable membrane 2 is as indicated in the description of the gas-permeable membrane 1 shown in FIG. 1. The average pore diameter of the black porous PTFE membrane 11 in the case of using the gas-permeable membrane 2 as a waterproof sound-transmitting membrane is also as indicated in the description of the gas-permeable membrane 1 shown in FIG. 1. When the gas-permeable membrane 2 has two or more black porous PTFE membranes 11, it is sufficient that at least one of the black porous PTFE membranes 11 have an average pore diameter as indicated above.

When the gas-permeable membrane 2 is used as a waterproof sound-transmitting membrane, the surface density of the gas-permeable membrane 2 (the total of the surface densities of a plurality of layers including the black porous PTFE membrane 11 and the gas-permeable supporting member 12) is preferably 1 to 10 $g/m^2$, more preferably 2 to 8 $g/m^2$, and even more preferably 3 to 6 $g/m^2$, from the viewpoint of ensuring both the physical strength and the sound transmitting properties of the membrane.

Figure 3:
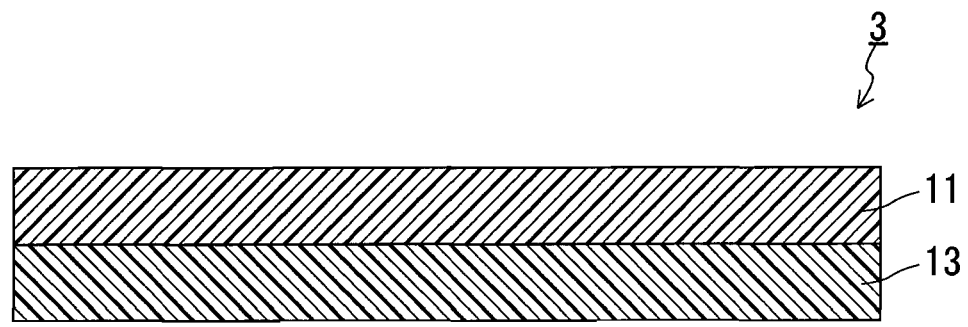
FIG. 3 is a cross-sectional view schematically showing still another example of the gas-permeable membrane of the present invention.

FIG. 3 shows another example of the gas-permeable membrane of the present invention. A gas-permeable membrane 3 of FIG. 3 has a multilayer structure including the black porous PTFE membrane 11 of the present invention and another porous PTFE membrane 13 other than the black porous PTFE membrane 11. The porous PTFE membrane 13 may be uncolored (that is, white), may be colored in any given color (e.g., black), or may be dyed black in such a manner that the whiteness of the principal face of the membrane is 18.0 to 23.0%, and that the whiteness of the principal face falls within a range of 18.0 and 25.0% after heating at 350° C. for 1 minute (that is, the porous PTFE membrane 13 may be the black porous PTFE membrane of the present invention). The whiteness of the principal face of the porous PTFE membrane 13 may be 23.0% or more. Similarly to the black porous PTFE membrane 11, the porous PTFE membrane 13 has a porous structure in which voids between a huge number of fine PTFE fibers (fibrils) formed are present as pores. The gas-permeable membrane 3 has the property of blocking entry of water and/or dust and allowing permeation of gases, by virtue of the above-described porous structure of at least one porous PTFE membrane selected from the black porous PTFE membrane 11 and the porous PTFE membrane 13.

In the gas-permeable membrane 3, the porous membrane 11 which is black is exposed to the outside. For example, if the gas-permeable membrane 3 is disposed at an opening of a housing of an electronic device in such a manner that the black porous PTFE membrane 11 faces the outside of the housing, the gas-permeable membrane 3 is less conspicuous than a white porous PTFE membrane. That is, the gas-permeable membrane of the present invention may have a multilayer structure including the black porous PTFE membrane 11 of the present invention and another porous PTFE membrane 13 other than the black porous PTFE membrane 11, and in this case, it is preferable that the black porous PTFE membrane be exposed on at least one principal face.

The gas-permeable membrane 3 may have two or more black porous PTFE membranes 11 and/or two or more porous PTFE membranes 13. In this case, the order in which they are stacked is not particularly limited.

The gas-permeable membrane 3 is not particularly limited in use, and can be suitably used as a waterproof sound-transmitting membrane, a waterproof gas-permeable membrane, or a dustproof gas-permeable membrane.

In the gas-permeable membrane 3, the average pore diameter of at least one porous PTFE membrane selected from the black porous PTFE membrane 11 and the porous PTFE membrane 13 is as indicated in the description of the gas-permeable membrane 1 shown in FIG. 1. Also when the gas-permeable membrane 3 is used as a waterproof sound-transmitting membrane, the average pore diameter of at least one porous PTFE membrane selected from the black porous PTFE membrane 11 and the porous PTFE membrane 13 is as indicated in the description of the gas-permeable membrane 1 shown in FIG. 1. When the gas-permeable membrane 3 has two or more black porous PTFE membranes 11 and/or two or more porous PTFE membranes 13, it is sufficient that at least one of the black porous PTFE membranes 11 and the porous PTFE membranes 13 have an average pore diameter as indicated above. The average pore diameter of the black porous PTFE membrane 11 and the average pore diameter of the porous PTFE membrane 13 may be equal to or different from each other.

When the gas-permeable membrane 3 is used as a waterproof sound-transmitting membrane, the surface density of the gas-permeable membrane 3 (the total of the surface densities of a plurality of layers including the black porous PTFE membrane 11 and the porous PTFE membrane 13) is preferably 1 to 10 $g/m^2$, more preferably 2 to 8 $g/m^2$, and even more preferably 3 to 6 $g/m^2$, from the viewpoint of ensuring both the physical strength and the sound transmitting properties of the membrane.

Figure 4:
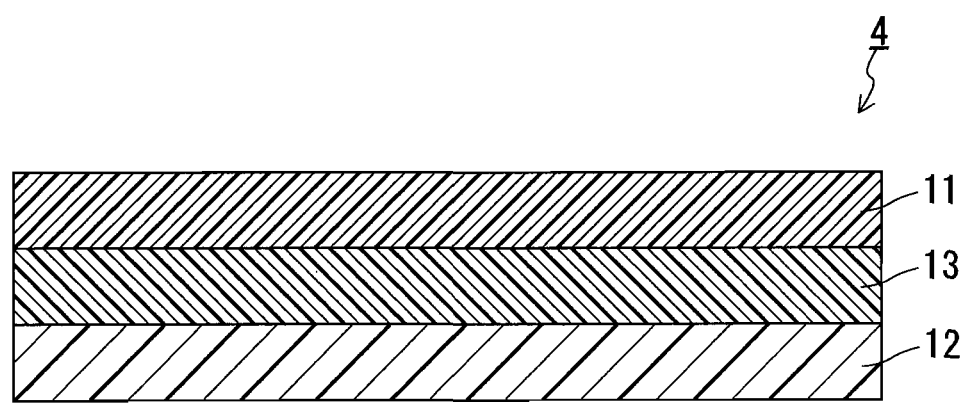
FIG. 4 is a cross-sectional view schematically showing still another example of the gas-permeable membrane of the present invention.

FIG. 4 shows another example of the gas-permeable membrane of the present invention. A gas-permeable membrane 4 of FIG. 4 includes the gas-permeable membrane 3 shown in FIG. 3, and further has the gas-permeable supporting member 12. In the gas-permeable membrane 4, the porous membrane 11 which is black is exposed to the outside. The gas-permeable supporting member 12 is as described for the gas-permeable membrane 2 shown in FIG. 2.

The gas-permeable membrane of the present invention may have any other member than the black porous PTFE membrane 11, the gas-permeable supporting member 12, and the porous PTFE membrane 13. In this case, it is preferable that the black porous PTFE membrane 11 be exposed on at least one principal face of the gas-permeable membrane of the present invention.

(Ventilation Member)

Figure 5:
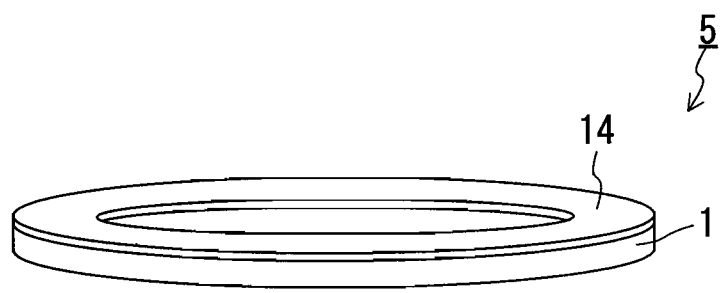
FIG. 5 is a perspective view schematically showing an example of the ventilation member of the present invention.

An example of the ventilation member of the present invention is shown in FIG. 5. A ventilation member 5 shown in FIG. 5 includes the gas-permeable membrane 1 of the present invention. The gas-permeable membrane 1 is disk-shaped, and a supporting member 14 in the shape of a ring is attached to an edge region of the gas-permeable membrane 1. According to the embodiment in which the supporting member 14 in the shape of a ring is provided, the gas-permeable membrane 1 can be reinforced, and can be handled more easily. In addition, since the supporting member 14 functions as a part to be attached to a housing of an electrical appliance, the efficiency of the operation of attachment of the gas-permeable membrane 1 to the housing is improved. In this ventilation member, the black porous PTFE membrane 11 may be used instead of the gas-permeable membrane 1.

The supporting member is not particularly limited in shape as long as it can support the gas-permeable membrane of the present invention. The supporting member is not particularly limited in material, and is typically made of a resin, a metal, or a composite material thereof.

The method of bonding the gas-permeable membrane 1 and the supporting member 14 together is not particularly limited. For example, a method such as heat welding, ultrasonic welding, bonding using an adhesive agent, or bonding using a double-faced tape, can be employed.

EXAMPLES

First, methods of evaluating black porous PTFE membranes and uncolored porous PTFE membranes fabricated as examples will be described.

[Whiteness]

The whiteness of each porous PTFE membrane was evaluated using a color-difference meter according to JIS L 1015 (Hunter method).

[Gas Permeability]

The gas permeability of each porous PTFE membrane was evaluated according to JIS P 8117 (Gurley method).

[Water Entry Pressure]

The water entry pressure of each porous PTFE membrane was determined using a water penetration testing apparatus (high hydraulic pressure method) specified in JIS L 1092. However, when the membrane has an area specified in JIS L 1092, the membrane undergoes a marked change in shape. Therefore, a stainless steel mesh (opening diameter=2 mm) was provided on the opposite side of the membrane to a surface subjected to a pressure in order to reduce the change in shape, and in this state the measurement was performed.

[Liquid Repellency]

A sheet of copy paper and each porous PTFE membrane were stacked together in such a manner that the sheet of copy paper was placed under the porous PTFE membrane. One drop of a lamp oil was applied to the porous PTFE membrane using a dropper, and then the stack was left for 1 minute. Thereafter, the porous membrane was removed, and the condition of the sheet of copy paper was checked. In the case where the sheet of copy paper was wet with the oil lamp, it was determined that the liquid repellency of the porous PTFE membrane was absent, while in the case where the sheet of copy paper was not wet, it was determined that the liquid repellency was present.

Example 1

An amount of 100 parts by weight of a PTFE fine powder (F 104 manufactured by DAIKIN INDUSTRIES, LTD.) and 20 parts by weight of n-dodecane (manufactured by Japan Energy Corporation) serving as a forming aid were uniformly mixed. The obtained mixture was compressed using a cylinder, and then formed into a sheet-shaped mixture by ram extrusion. Next, the sheet-shaped mixture obtained was rolled to a thickness of 0.2 mm by passing the mixture through a pair of metal rolls. Furthermore, the mixture was dried by heating at 150° C. to remove the forming aid, and thus a sheet-shaped body of PTFE was obtained. Next, the sheet-shaped body obtained was stretched in the longitudinal direction (rolling direction) at a stretching temperature of 260° C. at a stretching ratio of 10.

Next, the porous PTFE membrane fabricated as described above was immersed for several seconds in a dye solution obtained by mixing 20 parts by weight of a black dye (SP BLACK 91-L manufactured by ORIENT CHEMICAL INDUSTRIES CO., LTD., a 25 weight % solution diluted with ethanol) and 80 parts by weight of ethanol (purity=95%) which was a solvent for the dye. Thereafter, the entire porous PTFE membrane was heated to 100° C. and thereby dried to remove the solvent. Thus, a porous PTFE membrane dyed black was obtained. The black dye (SP BLACK 91-L) is sold in the form of a mixture containing "Solvent Black 7 (also known as Nigrosine)" as a black color component. "Solvent Black 7" is an azine-based dye having a phenazine ring. "Solvent Black 7" has a melting point of 450° C. Next, the black porous PTFE membrane fabricated as described above was immersed in a liquid-repellent agent for several seconds, and then the entire black porous PTFE membrane was heated to 100° C. and dried to remove the solvent. Thus, a black porous PTFE membrane subjected to liquid-repellent treatment was obtained. The liquid-repellent agent was prepared by the following procedures. An amount of 100 g of a compound having a linear fluoroalkyl chain and represented by $CH_2=CHCOOCH_2CH_2C_6F_{13}$, 0.1 g of azobisisobutyronitrile serving as a polymerization initiator, and 300 g of a solvent ("FS thinner" manufactured by Shin-Etsu Chemical Co., Ltd.) were put into a flask fitted with a nitrogen introducing pipe, a thermometer, and a stirrer. A nitrogen gas was introduced to allow addition polymerization to proceed under stirring at 70° C. for 16 hours. Thus, 80 g of a fluorine-containing polymer was obtained. This fluorine-containing polymer had a number average molecular weight of 100,000. The fluorine-containing polymer was diluted with a diluent ("FS thinner" manufactured by Shin-Etsu Chemical Co., Ltd.) to a concentration of 3.0%, and thus the liquid-repellent agent was prepared.

Next, the membrane was stretched in the width direction at a stretching temperature of 150° C. at a stretching ratio of 10, and in addition, the entire membrane was calcined at 360° C. which is a temperature above the melting point of PTFE. Thus, a porous PTFE membrane was obtained. The obtained porous PTFE membrane had an average pore diameter of 0.5 μm and a surface density of 6 g/m². As shown in Table 1, the whiteness of the black porous PTFE membrane as thus obtained was 20.0%, its gas permeability was 1.0 second/100 mL, its water entry pressure was 150 kPa, and its liquid repellency was "Present". The black porous PTFE membrane does not undergo color fading even when heated at 400° C. Therefore, the black porous PTFE membrane does not undergo color fading even when calcined at 360° C.

TABLE 1

| | Type of black color agent | Concentration of black color agent *Solid content [weight %] | Treatment | Whiteness | Gas permeability [s/100 mL] | Water entry pressure [kPa] | Liquid repellency |
|---|---|---|---|---|---|---|---|
| Example 1 | SP BLACK 91-L | 5.0 | Before stretching | 20.0 | 1.0 | 150 | Present |
| Example 2 | SP BLACK 91-L | 3.0 | Before stretching | 22.8 | 1.1 | 155 | Present |
| Example 3 | SP BLACK 91-L | 8.0 | Before stretching | 18.1 | 1.0 | 140 | Present |
| Example 4 | SP BLACK 91-L | 0.5 | After stretching | 19.2 | 1.1 | 150 | Present |
| Comp. Example 1 | VALIFAST BLACK 3810 | 5.0 | Before stretching | 52.1 | 1.1 | 140 | Present |
| Comp. Example 2 | VALIFAST BLACK 3810 | 0.5 | After stretching | 21.4 | 1.2 | 150 | Present |

Black porous PTFE membranes fabricated according to Example 1 were heated at 350° C. for 1 minute or 5 minutes. The heating was performed in a situation where each porous membrane was fixed in a metal frame so as to prevent contraction. As shown in Table 2, the whiteness of the principal face of the black porous PTFE membrane heated at 350° C. for 1 minute was 21.0%, and the whiteness of the principal face of the black porous PTFE membrane heated at 350° C. for 5 minutes was 21.0%.

TABLE 2

| | Whiteness | | | | | |
|---|---|---|---|---|---|---|
| | Example 1 | Example 2 | Example 3 | Example 4 | Comp. Example 1 | Comp. Example 2 |
| Unheated | 20.0 | 22.8 | 18.1 | 19.2 | 52.1 | 21.4 |
| At 350° C. for 1 minute | 21.0 | 23.1 | 18.5 | 19.3 | 57.7 | 40.3 |
| At 350° C. for 5 minutes | 21.0 | 23.2 | 18.5 | 20.1 | 62.5 | 62.8 |

Black porous PTFE membranes fabricated according to Example 1 were respectively washed by immersion in alcohols for 1 minute. As the alcohols, methanol, ethanol, IPA (isopropyl alcohol), and MEK (methyl ethyl ketone) were used. As shown in Table 3, the whiteness of the principal face of the black porous PTFE membrane washed with methanol was 23.8%, the whiteness of the principal face of the black porous PTFE membrane washed with ethanol was 23.5%, the whiteness of the principal face of the black porous PTFE membrane washed with IPA was 21.3%, and the whiteness of the principal face of the black porous PTFE membrane washed with MEK was 22.9%. The alcohols may be mixed liquids of two or more of methanol, ethanol, IPA (isopropyl alcohol), and MEK (methyl ethyl ketone).

TABLE 3

| | Whiteness | | | | | |
|---|---|---|---|---|---|---|
| | Example 1 | Example 2 | Example 3 | Example 4 | Comp. Example 1 | Comp. Example 2 |
| Unwashed | 20.0 | 22.3 | 18.1 | 19.2 | 52.1 | 21.4 |
| Washed with methanol | 23.8 | 24.1 | 18.7 | 62.1 | 63.3 | 63.2 |
| Washed with ethanol | 23.5 | 24.8 | 18.4 | 60.1 | 62.2 | 63.5 |
| Washed with IPA | 21.3 | 22.9 | 18.2 | 52.5 | 63.9 | 63.1 |
| Washed with MEK | 22.9 | 23.8 | 18.8 | 61.1 | 62.0 | 62.4 |

Example 2

Black porous PTFE membranes subjected to liquid-repellent treatment were obtained in the same manner as in Example 1, except that the concentration of the treatment agent in the dye solution was 3.0 weight %. As shown in Table 1, the whiteness of the black porous PTFE membrane as thus obtained was 22.8%, its gas permeability was 1.1 seconds/100 mL, its water entry pressure was 155 kPa, and its liquid repellency was "Present". As shown in Table 2, the whiteness of the principal face of the black porous PTFE membrane heated at 350° C. for 1 minute was 23.1%, and the whiteness of the principal face of the black porous PTFE membrane heated at 350° C. for 5 minutes was 23.2%. Next, black porous PTFE membranes fabricated according to Example 2 were respectively washed by immersion in alcohols for 1 minute. As shown in Table 3, the whiteness of the principal face of the black porous PTFE membrane washed with methanol was 24.1%, the whiteness of the principal face of the black porous PTFE membrane washed with ethanol was 24.8%, the whiteness of the principal face of the black porous PTFE membrane washed with IPA was 22.9%, and the whiteness of the principal face of the black porous PTFE membrane washed with MEK was 23.8%.

Example 3

Black porous PTFE membranes subjected to liquid-repellent treatment were obtained in the same manner as in Example 1, except that the concentration of the treatment agent in the dye solution was 8.0 weight %. As shown in Table 1, the whiteness of the black porous PTFE membrane as thus obtained was 18.1%, its gas permeability was 1.0 second/100 mL, its water entry pressure was 140 kPa, and its liquid repellency was "Present". As shown in Table 2, the whiteness of the principal face of the black porous PTFE membrane heated at 350° C. for 1 minute was 18.5%, and the whiteness of the principal face of the black porous PTFE membrane heated at 350° C. for 5 minutes was 18.5%. Next, black porous PTFE membranes fabricated according to Example 3 were respectively washed by immersion in alcohols for 1 minute. As shown in Table 3, the whiteness of the principal face of the black porous PTFE membrane washed with methanol was 18.7%, the whiteness of the principal face of the black porous PTFE membrane washed with ethanol was 18.4%, the whiteness of the principal face of the black porous PTFE membrane washed with IPA was 18.2%, and the whiteness of the principal face of the black porous PTFE membrane washed with MEK was 18.8%.

Example 4

Black porous PTFE membranes subjected to liquid-repellent treatment were obtained in the same manner as in Example 1, except that the concentration of the treatment agent in the dye solution was 0.5 weight % and that the black dyeing and the treatment with the liquid-repellent agent were performed after the stretching in the width direction and the calcining. As shown in Table 1, the whiteness of the black porous PTFE membrane as thus obtained was 19.2%, its gas permeability was 1.1 seconds/100 mL, its water entry pressure was 150 kPa, and its liquid repellency was "Present". As shown in Table 2, the whiteness of the principal face of the black porous PTFE membrane heated at 350° C. for 1 minute was 19.3%, and the whiteness of the principal face of the black porous PTFE membrane heated at 350° C. for 5 minutes was 20.1%. Next, black porous PTFE membranes fabricated according to Example 4 were respectively washed by immersion in alcohols for 1 minute. As shown in Table 3, the whiteness of the principal face of the black porous PTFE membrane washed with methanol was 62.1%, the whiteness of the principal face of the black porous PTFE membrane washed with ethanol was 60.1%, the whiteness of the principal face of the black porous PTFE membrane washed with IPA was 52.5%, and the whiteness of the principal face of the black porous PTFE membrane washed with MEK was 61.1%.

Comparative Example 1

Black porous PTFE membranes subjected to liquid-repellent treatment were obtained in the same manner as in Example 1, except that the black dye in the dye solution was "VALIFAST BLACK 3810" manufactured by ORIENT CHEMICAL INDUSTRIES CO., LTD. "VALIFAST BLACK 3810" is an azo-based chromium-containing dye (also known as an azo-chromium complex). The melting point of "VALIFAST BLACK 3810" is 359° C., and is about 100° C. lower than 450° C. which is the melting point of "Solvent Black 7" used in Examples 1 to 4. As shown in Table 1, the whiteness of the black porous PTFE membrane as thus obtained was 52.1%, its gas permeability was 1.1 seconds/100 mL, its water entry pressure was 140 kPa, and its liquid repellency was "Present". As shown in Table 2, the whiteness of the principal face of the black porous PTFE membrane heated at 350° C. for 1 minute was 57.7%, and the whiteness of the principal face of the black porous PTFE membrane heated at 350° C. for 5 minutes was 62.5%. Next, black porous PTFE membranes fabricated according to Comparative Example 1 were respectively washed by immersion in alcohols for 1 minute. As shown in Table 3, the whiteness of the principal face of the black porous PTFE membrane washed with methanol was 63.3%, the whiteness of the principal face of the black porous PTFE membrane washed with ethanol was 62.2%, the whiteness of the principal face of the black porous PTFE membrane washed with IPA was 63.9%, and the whiteness of the principal face of the black porous PTFE membrane washed with MEK was 62.0%.

Comparative Example 2

Black porous PTFE membranes subjected to liquid-repellent treatment were obtained in the same manner as in Example 1, except that the black dye in the dye solution was "VALIFAST BLACK 3810" manufactured by ORIENT CHEMICAL INDUSTRIES CO., LTD, the concentration of the treatment agent in the dye solution was 0.5 weight %, and the black dyeing and the treatment with the liquid-repellent agent were performed after the stretching in the width direction and the calcining. As shown in Table 1, the whiteness of the black porous PTFE membrane as thus obtained was 21.4%, its gas permeability was 1.2 seconds/100 mL, its water entry pressure was 150 kPa, and its liquid repellency was "Present". As shown in Table 2, the whiteness of the principal face of the black porous PTFE membrane heated at 350° C. for 1 minute was 40.3%, and the whiteness of the principal face of the black porous PTFE membrane heated at 350° C. for 5 minutes was 62.8%. Next, black porous PTFE membranes fabricated according to Comparative Example 2 were respectively washed by immersion in alcohols for 1 minute. As shown in Table 3, the whiteness of the principal face of the black porous PTFE membrane washed with methanol was 63.2%, the whiteness of the principal face of the black porous PTFE membrane washed with ethanol was 63.5%, the whiteness of the principal face of the black porous PTFE membrane washed with IPA was 63.1%, and the whiteness of the principal face of the black porous PTFE membrane washed with MEK was 62.4%.

As shown in Table 1, there was scarcely a difference in properties between the porous PTFE membranes fabricated in Examples 1 to 4 and Comparative Examples 1 and 2, except for the difference in whiteness. As shown in Table 2, the black porous PTFE membranes fabricated in Comparative Examples 1 and 2 developed color fading by heating, while the black porous PTFE membranes fabricated in Examples 1 to 4 did not undergo color fading. As shown in Table 3, the black porous PTFE membranes fabricated in Comparative Examples 1 and 2 and Example 4 developed color fading by alcohols, while the black porous PTFE membranes fabricated in the other examples did not undergo color fading. As shown in Tables 2 and 3, the black porous PTFE membranes fabricated in Comparative Examples 1 and 2 developed color fading by heating at 350° C., and the black porous PTFE membranes fabricated in Comparative Examples 1 and 2 and Example 4 underwent color fading by alcohols. However, the black porous PTFE membranes fabricated in Examples 1 to 3 did not undergo color fading by heating at 350° C. or by alcohols.

The present inventors infer that the reason why color fading was not caused by heating at 350° C. in Examples 1 to 4 is that the dye has high heat resistance. The present inventors infer that the reason why color fading was not caused by alcohols in Examples 1 to 3 is as follows. If black coloring treatment is merely performed, the black dye settles on the peripheries of the fibers of the porous PTFE membrane. The dye is caused to attach to the porous PTFE membrane by performing the black coloring treatment before stretching, the porous PTFE membrane is heated to the melting point or higher and melted in the calcining step after the stretching step, so that the dye reaches and settles in the interior of the fibers of the porous PTFE membrane. Alcohols cannot penetrate into PTFE; therefore, it is thought that color fading caused by alcohols could be prevented as a result of the black dye settling in the interior of the fibers of the porous PTFE membrane.

INDUSTRIAL APPLICABILITY

The black porous PTFE membrane of the present invention can be used in the same applications as conventional porous PTFE membranes, such as uses as a waterproof sound-transmitting membrane, a waterproof gas-permeable membrane, and a dustproof gas-permeable membrane.

The invention claimed is:

1. A black porous polytetrafluoroethylene membrane comprising a porous polytetrafluoroethylene membrane dyed black having a porous structure,
wherein the porous structure has voids formed between fibrils of polytetrafluoroethylene, which are fibers of the polytetrafluoroethylene, as pores in the porous structure,
a whiteness of a principal surface of the black porous polytetrafluoroethylene membrane as measured according to JIS L 1015 (Hunter method) is in a range from 18.0 to 23.0%, and
the whiteness of the principal surface falls within a range from 18.0 and 25.0% after heating at 350° C. for 1 minute.

2. The black porous polytetrafluoroethylene membrane according to claim 1,
wherein the whiteness of the principal surface of the black porous polytetrafluoroethylene membrane falls within a range from 18.0 to 25.0% after washing the membrane by immersion of the membrane in at least one solution selected from the group consisting of methanol, ethanol, isopropyl alcohol, and methyl ethyl ketone, for 1 minute.

3. A method for producing the black porous polytetrafluoroethylene membrane according to claim 1, comprising:
a forming step of forming a sheet-shaped body from a mixture containing polytetrafluoroethylene;
a first stretching step of stretching the sheet-shaped body in a first direction so as to form a porous membrane;
a dyeing step of dyeing black the sheet-shaped body stretched in the first direction; and
a second stretching step of stretching the sheet-shaped body in a second direction different from the first direction so as to form a black porous membrane.

4. The method according to claim 3 for producing the black porous polytetrafluoroethylene membrane, further comprising a liquid-repellent treatment step of subjecting the black porous polytetrafluoroethylene membrane to liquid-repellent treatment, the liquid-repellent treatment step being performed after the second stretching step.

5. A gas-permeable membrane that blocks entry of water and/or dust and allows permeation of gases, the gas-permeable membrane having a multilayer structure comprising:
the black porous polytetrafluoroethylene membrane according to claim 1; and
a gas-permeable supporting member,
wherein the black porous polytetrafluoroethylene membrane is exposed on at least one principal face of the gas-permeable membrane.

6. A ventilation member comprising:
the black porous polytetrafluoroethylene membrane according to claim 1; and
a supporting member supporting the black porous polytetrafluoroethylene membrane.

7. A ventilation member comprising:
the gas-permeable membrane according to claim 5; and
a supporting member supporting the gas-permeable membrane.

* * * * *